Patented Oct. 5, 1943

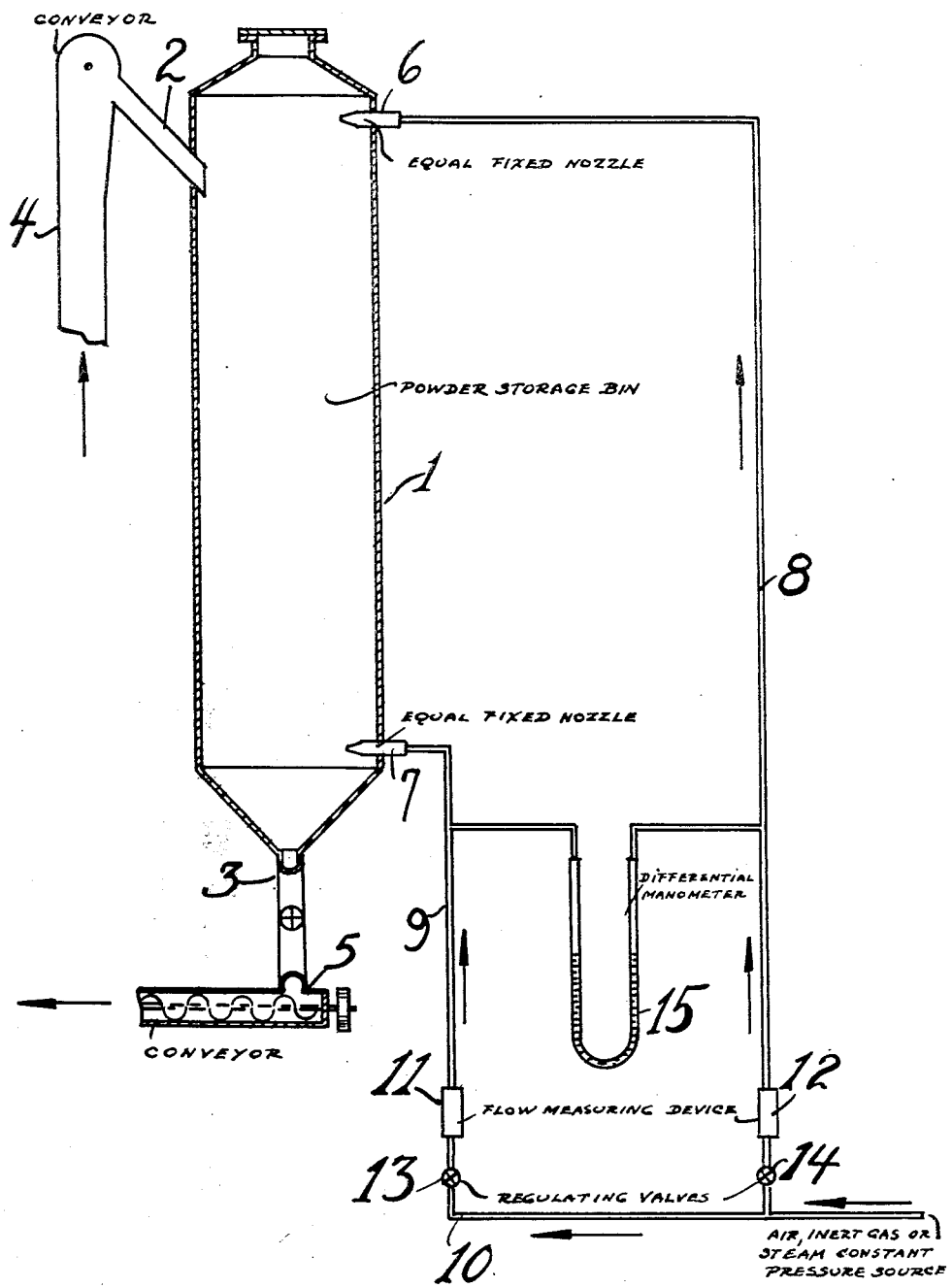

2,331,208

UNITED STATES PATENT OFFICE 2,331,208

POWDERED MATERIAL LEVEL INDICATOR

William C. Ludi, Matawan, N. J., assignor to Standard Oil Development Company, a corporation of Delaware Application July 27, 1940, Serial No. 347,924

4 Claims. (Cl. 73—290)

The present invention relates to a method and a means for determining the level of powdered or finely divided solid materials in a storage bin. More particularly, it relates to such a method and means for gauging the level of a body of material in a reservoir which may be under variable pressure from which portions of the material are being continuously withdrawn, and to which fresh portions are added.

The invention and its objects are fully set forth in the following specification and may be readily understood therefrom, when it is read in conjunction with the accompanying drawing. The single figure provided is a diagrammatic illustration of a storage bin equipped according to the invention.

In the drawing, the numeral 1 designates a storage bin for finely divided solid materials having a supply inlet 2 and a discharge outlet 3. As shown, screw conveyor mechanisms 4 and 5 are provided for the introduction and withdrawal of the bin contents. The level of powdered material in the bin or container 1 is determined by means of a fixed orifice nozzle 6 opening through the sidewall of the bin at a point well above the level of powder normally to be maintained, and a second such nozzle 7 opening through the sidewall at a low point in the container. Preferably the lower nozzle should be disposed at or about the bottom of the container, as shown. The nozzles should be selected and adjusted so that the pressure drop through each is of equal value.

Provision is made for the application of an equal pressure to each of the nozzles 6 and 7, by means of lines 8 and 9 through which small quantities of a gas or steam may be delivered to the nozzles and discharged therethrough. The feed line 10 is connected to each of the lines 8 and 9. Flow measuring devices 11 and 12 and regulating valves 13 and 14 in the respective lines, assist in maintaining the desired uniform operation of the nozzles. A differential manometer 15, connected across the parallel lines 8 and 9, is used to indicate the relation of pressure in lines 8 and 9.

In operation, after the manometer has been balanced by suitable adjustment of the regulating valves 13 and 14, it is calibrated into pounds or feet of material above the lower nozzle 7, so that as the level of the material rises or falls above the nozzle, the back pressure created will be directly indicated by the manometer in such terms as are most convenient. The upper nozzle in the container provides compensation for any changes in pressure or temperature which may occur in the container. It is to be noted that while the use of a manometer has been shown and described, any other suitable or equivalent pressure indicating or recording device may be substituted in the system. Also, if desired, the pressure recording or indicating device utilized may be connected in a suitable control mechanism in a conventional manner to provide for automatic maintenance of the level of material in the bin.

Obviously, various modifications may be made in the specific embodiment set forth above, and in the drawing, and it is not intended that the invention shall be limited by such description provided for the purpose of illustration, but only by the appended claims.

It is claimed:

1. Apparatus for determining the level of a powdered material in a closed container, comprising a nozzle member opening into the container at the bottom, a second nozzle member of similar character, opening into the container in upwardly spaced relation to the first, conduit means connecting said nozzles to a common supply of a gaseous medium under pressure, means for normally balancing the pressure drop through the nozzles and conduit means, and meter means between said nozzles indicating the degree of unbalance occasioned by a head of powdered material above said lower nozzle.

2. Apparatus for determining the level of a powdered material in a closed container, comprising a nozzle member opening into the container at the bottom, a second nozzle member of similar character, opening into the container in upwardly spaced relation to the first, conduit means for supplying a gaseous medium to the lower nozzle under pressure, conduit means for supplying a gaseous medium to the upper nozzle under pressure, means for normally balancing the pressure drop through the respective nozzles, and a manometer communicating with the respective conduit means to indicate said balance and any variation thereof occasioned by a change in the level of powdered material in said container.

3. A method for determining the level of a powdered material in a container, comprising injecting a gaseous medium into a container at a low point thereof below the level of powdered material therein, simultaneously injecting a similar medium into said container at a point substantially above the level of powdered material therein, initially substantially balancing the injection pressure drop through the respective points when the container is empty, and measuring the variation in pressure drop, caused by the presence of powdered material and variations in level of the powdered material in the container between said injection points.

4. A method for determining the level of a powdered material in a closed container comprising injecting a gaseous medium through a nozzle member into the container at the bottom portion and normally below the level of powdered material in the container, simultaneously injecting a gaseous medium through a second nozzle member into the container at a vertically spaced point from said first nozzle member and into the space above the level of powdered material in the container and measuring the variation in the pressure drop through said nozzle members caused by a change in level of powdered material in the container.

WILLIAM C. LUDI.